United States Patent [19]

Henderson et al.

[11] Patent Number: 5,621,551
[45] Date of Patent: Apr. 15, 1997

[54] IMMERSED DICHROIC SYSTEM FOR SINGLE PROJECTION LENS LIQUID CRYSTAL VIDEO PROJECTOR

[75] Inventors: Alan R. Henderson, Carlsbad; Ralph Gagnon, Chico, both of Calif.

[73] Assignee: Hughes-JVC Technology Corporation, Carlsbad, Calif.

[21] Appl. No.: 55,637

[22] Filed: Apr. 30, 1993

[51] Int. Cl.⁶ ................................. G02F 1/1335
[52] U.S. Cl. ................................. 349/7; 349/8
[58] Field of Search .................. 359/40, 41; 353/31, 353/119

[56] References Cited

U.S. PATENT DOCUMENTS

| | | | |
|---|---|---|---|
| 4,127,322 | 11/1978 | Jacobson et al. | 359/41 |
| 4,425,028 | 1/1984 | Gagnon et al. | 359/40 |
| 4,749,259 | 6/1988 | Ledebuhr | 359/41 |
| 4,943,155 | 7/1990 | Cross, Jr. | 359/40 |
| 5,028,121 | 7/1991 | Baur et al. | 359/40 |
| 5,105,289 | 4/1992 | Sonehara et al. | 359/40 |
| 5,153,752 | 10/1992 | Kurematsu et al. | 359/40 |
| 5,200,843 | 4/1993 | Karasawa et al. | 359/40 |
| 5,231,431 | 7/1993 | Yano et al. | 359/40 |
| 5,239,322 | 8/1993 | Takanashi et al. | 359/40 |
| 5,268,775 | 12/1993 | Zeidler | 359/40 |
| 5,309,188 | 5/1994 | Burstyn | 359/40 |

*Primary Examiner*—Anita Pellman Gross
*Attorney, Agent, or Firm*—Harness, Dickey & Pierce, P.L.C.

[57] ABSTRACT

An LCLV projection system (10) includes color separation dichroic mirrors (50, 52) positioned between a group of reflective liquid crystal light valves (38, 40, 42) and a polarizer analyzer (26) which enables a single projection lens (34) to project all colors via a light beam of single linear polarization with a high degree of contrast, efficiency and color separation. The polarizer analyzer (26) directs a light beam with a single polarization state to a pair of dichroic filters (50, 52) which separate the beam into three different colors that are sent to three different reflective liquid crystal light valves (38, 40, 42). The light valves reflect the respective colored light beams with change in polarization state back to the dichroic mirrors (50, 52) which combine the three colors into a single combined multi-color beam that is fed through the polarizer analyzer (26) to a single system projection lens (34). The polarizer analyzer (26) and dichroic mirrors (50, 52) are enclosed in a fluid filled enclosure (28) containing an optical fluid which has an index of refraction substantially the same as that of the substrate of the dichroic mirrors (50, 52), for effectively increasing the back focal length of the projection lens (34).

17 Claims, 5 Drawing Sheets

IMMERSED DICHROIC SYSTEM FOR SINGLE PROJECTION LENS LIQUID CRYSTAL VIDEO PROJECTOR

CROSS-REFERENCE TO RELATED APPLICATION

The present application contains subject matter which is related to co-pending U.S. Patent application Ser. No. 08/040,755 entitled "Single Projection Lens Color Projection System" which is assigned to the same assignee as the present invention and which is incorporated herein by reference.

BACKGROUND OF THE INVENTION

1. Field of the Invention

The present invention relates to liquid crystal light valve color projection systems, and more particularly to an apparatus and method for separating and combining colors in a single projection lens liquid crystal light valve projection system.

2. Discussion

Optical projection systems, such as video projector systems are used for projecting images onto a screen. Since projection systems can project images at a wide range of sizes (within certain limitations), these systems can potentially yield larger images than conventional imaging systems such as CRTs. In the most common approach, video projection systems employ three CRTs, each projecting one of the primary colors (red, green or blue) onto a screen. However, as the size of the projected image is increased, its brightness is reduced. To overcome this and other problems, projection systems incorporating liquid crystal light valves (LCLVs) have allowed important advances by providing increased light output. LCLVs have been used in many applications, such as those where a very large projection screen must be illuminated by a projector occupying a very small volume, and also in very high brightness projection display systems. In general, where the intensity of light emitted by a conventional screen such as a cathode ray tube is not adequate because of high ambient light conditions, or where very large projection screens are employed in limited space, liquid crystal color display projection systems are preferred.

Liquid crystal light valve projection systems are generally either of the transmission type (active-matrix) or the reflective type. In transmission (active matrix) liquid crystal light valves, each liquid crystal light valve individually modulates its respective monochromatic beam over a spatial array of pixels, and the beams are then combined with a multiplexer or combining prism and projected as a single combined beam of appropriate color. The combined beam bears information imposed thereon by computer controlled modulation of the several liquid crystal light valves. The combined beam is fed through a projection lens onto the front or back surface of a diffuse display screen to provide appropriate display on the screen surface.

In some active-matrix liquid crystal projectors, dichroic mirrors separate white light emitted by a high intensity halogen lamp into three monochromatic beams, red, blue and green. These are passed through the individual liquid crystal modulator panels, and the resulting modulated monochromatic light beams are combined into a single multi-color beam by an X-prism, and then projected through a set of lenses onto the screen. Such systems necessarily employ large numbers of optical relay systems or optical elements, such as lenses and mirrors, to split and distribute reading light from the source lamp to the various liquid crystal modules. Further, these relay systems require significant amounts of space to position the several dichroic reflecting mirrors, which in and of themselves require optical relay systems to provide longer focal lengths that enable proper positioning of such additional components. Physical size of the system is therefore greatly increased.

Similar problems, e.g., large numbers of components and increased space requirements, exist in those projection systems employing reflective liquid crystal light valves. In some reflective liquid crystal light valve systems reading light from a high powered source is polarized by a polarizing beam splitting prism designed to reflect "S" polarized light (in which the polarization axis, namely the E field vector, is parallel to the plane of incidence) and to transmit "P" polarized light (in which the polarization axis, the E field vector is perpendicular to the plane of incidence). The "S" polarization component of the reading light is reflected to the light valve, which, when activated by an image from a writing light source, such as a cathode ray tube, reflects the polarized light and rotates its polarization 90° so that it becomes "P" polarized light. The "P" polarization component is transmitted through the prism to the projection lens. When such reflective liquid crystal light valves are employed in a color projection system, the input light path must be lengthened by additional relay optics to provide for separation of the reading light source into three color components and prepolarization of the several color components.

Often LCLV projection systems are configured with three separate projection lenses, one for each of the red, green and blue primary colors. However, there are a number of disadvantages with the use of three projection lenses. Three projection lenses add significantly to the number of optical components as well as to the overall size and cost of the system. Further, the image produced by the three lens projector must be converged repeatedly if the distance between the projector and the screen is subsequently varied. That is, the three individual projector lenses are angled toward the screen and will achieve exact convergence at only one projector lens to screen distance. However, if the screen is further away the projector lenses will have to be angled at less of an angle and if the screen is moved closer the lenses will have to be turned at greater angles. Alternatively, it is possible to move the image on the CRT instead of changing the angle of the lens itself. Either way, however, any change in the distance between the screen and the projector requires considerable adjustment. Similarly, trapezoidal correction differs for each projection lens and must be individually corrected as well.

Single projection lens systems offer the potential for a reduced size and lower cost because they can be made using fewer optical components. They also eliminate the above-discussed need to repetitively converge the three primary color images. However, the advantages of existing single projection lens systems are counterbalanced by at least two primary disadvantages. First, single lens video projector systems are characterized by large light losses because of the use of series trim filters and rejection of one light polarization for each color.

That is, since it is desirable to have spectral notches between the blue, green and red primary colors, trim filters are necessary to produce the desired spectral separation between red, green and blue to achieve a desired level of color saturation. But these involve not insignificant light losses. Also, the rejection of one light polarization for each color is a problem because such systems generally use one linear polarization of light for one primary color and the orthogonal polarization for the other two primary colors. In these systems, unpolarized light is the required input to the polarizer/analyzer. Since one of the two orthogonal polarizations of light is rejected for each primary color, the system is, at best, only 50% efficient in terms of light use.

A second disadvantage with existing single lens systems is the necessity to orient the liquid crystal light valves at angles with respect to one another. This requirement means that the three CRTs that write on the liquid crystal light valves cannot be arranged in a very compact manner. That is, canting the elongated CRTs at angles takes up far more space than would a roughly parallel CRT arrangement. While it might be possible to decrease the space requirements by incorporating a parallel CRT arrangement, this would require a lengthened air optical path utilizing folding mirrors which would necessitate a projection lens with a much longer back focal length. This is not economically feasible in most systems since the diameter and cost of a lens increases significantly as the back focal length increases. Thus, this cost constraint significantly limits the ability to design a more compact projector optical configuration.

An additional problem with liquid crystal light valve projection systems which utilize dichroic filter configurations is the resulting astigmatism in the projected image that results whenever an angled dichroic filter configuration is used in air.

Other problems arise with conventional liquid crystal light valve systems in general. For example, the complex optical components are generally exposed to air. This allows dust and other airborne particles in to the critical light valve optical imaging path. This results in particle and haze contamination on the optical surfaces in that path. Particle and haze contamination will detract from the contrast ratio and the efficiency of light use.

Thus, it would be desirable to provide a liquid crystal light valve projection system which has a simplified construction to minimize the number of optical components as well as the size and cost of the overall system. Further, it would be desirable to provide such a liquid crystal light valve system which makes relatively efficient use of input light to provide a high output light projection system. It would also be desirable to provide a system with the above features that also provides adequate spectral notches between the red, green and blue spectra to provide a high degree of color saturation with a low amount of distortion such as astigmatism. It would further be desirable to provide the above features in a system that minimizes the particle and haze contamination of its optical components.

SUMMARY OF THE INVENTION

Pursuant to the present invention, an optical projection system is provided which includes a source of linearly polarized light having a first orientation, three liquid crystal light valves and a means for energizing the liquid crystal light valves (LCLVs). A polarizer/analyzer receives and reflects polarized light having a first orientation from the source. A first dichroic filter is disposed in the path of light reflected from the polarizer/analyzer and reflects light of a first wavelength band and transmits light of second and third wavelength bands, the light of the first wavelength band being thereupon transmitted to a first LCLV. A second dichroic filter receives light of the second and third wavelength bands from the first dichroic filter and reflects light of a second wavelength band and transmits light of a third wavelength band, the light of the second wavelength band and third wavelength bands being thereupon transmitted to the second and third LCLVs respectively. The means for energizing the LCLVs causes selected areas of the LCLVs to rotate the polarization of the incoming light; upon its reflection off the LCLVs the light returns along its incoming path. The three bands of light are recombined as they pass through the first and/or second dichroic filters in a reverse direction. The combined light is then transmitted by the polarizer/analyzer in selected areas to a projector lens due to its rotated polarization. An enclosure substantially filled with a transparent non-gaseous media encloses at least the first and second dichroic mirrors and the polarizer/analyzer, wherein the light path between the polarizer/analyzer and the dichroic mirrors traverses this media.

The present invention results in improved efficiency since it does not reject one of two orthogonal polarizations and instead it derives all three primary colors from a single linear polarization of light. The dual pass dichroic filter configuration minimizes the number of optical components required to produce an image with a high degree of color saturation, since desirable spectral notches can be produced by controlling the separation between transition wavelengths for S and P state polarizations without the use of inefficient trim filters. The use of the immersion medium effectively increases the back focal length of the projector lens over what it would be in air. This results in considerable space and cost advantages and reduces the astigmatism and minimizes particle and haze contamination.

BRIEF DESCRIPTION OF THE DRAWINGS

The various advantages of the present invention will become apparent to one skilled in the art by reading the following specification and by reference to the following drawings in which.

DETAILED DESCRIPTION OF THE PREFERRED EMBODIMENTS

Figure 1A:
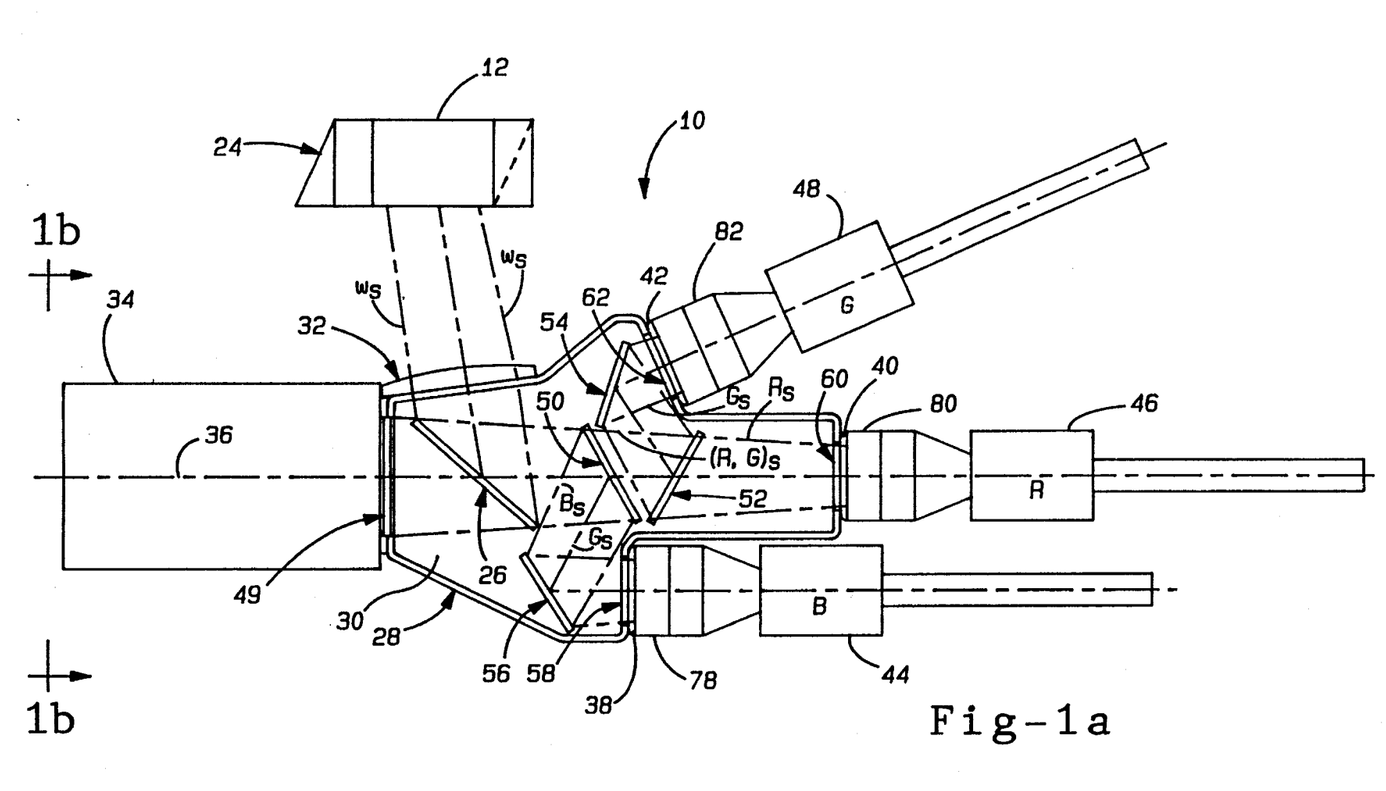
FIG. 1A is a diagram of the main components of the liquid crystal light valve projector system of the present invention.
Figure 1B:
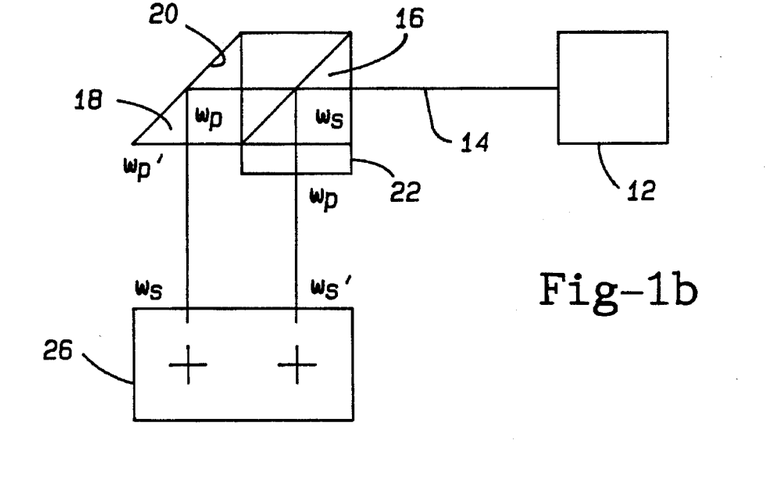
FIG. 1B is a diagram of a sectional view of the liquid crystal light valve projector system of FIG. 1A taken along line 1B—1B.

FIGS. 1A and 1B illustrate the basic components and configuration of parts of a color liquid crystal light valve projection system 10 embodying principles of the present invention. A source of very high intensity reading light 12 may include a xenon arc lamp, various relay mirrors and prepolarization filters (not shown). The source 12 provides on an input path 14 a high intensity reading beam having a full spectral content from approximately 420 nanometers to 680 nanometers to cover blue, green and red colors. Reading light from source 12 is unpolarized and directed toward a polarizing beam splitting prism 16 that reflects light of S polarization ($W_S$) and passes light of P polarization ($W_P$), to a reflecting prism 18. The P polarized light undergoes total internal reflection at the glass-air interface 20 of prism 18. The S polarized light is directed to and through a half wavelength retarder plate 22 which rotates polarization of the S polarized light to provide a recovered beam of P polarized light, $W_P'$ in a beam parallel to the totally internally reflected (TIR) beam $W_P'$. The polarizing beam splitting prism 16 reflecting prism 18 and half wavelength retarder plate 22 collectively comprise a polarization converter 24.

The two parallel beams of P polarized light are S polarized with respect to a polarizer/analyzer 26. They smoothly merge into a single quasi-rectangular beam that is fed to the substantially conventional polarizer/analyzer 26. The polarizer/analyzer 26 comprises a polarizing beam splitting mirror coated so as to reflect all wavelengths of light having an S polarization, for example, and to transmit all wavelengths of light having a P state polarization. Thus, even if incoming reading light transmitted to analyzer 26 should include light of both S and P polarization states, the use of the polarizer/analyzer 26 would ensure that only light of polarization state S is reflected. This arrangement is more efficient than previous designs in that P polarization light has been converted to S polarization before reaching polarizer/analyzer 26.

An enclosure 28 encloses the polarizer/analyzer 26 as well as additional optical components to be described in more detail hereinafter. In the preferred embodiment, enclosure 28 is a sealed diecast metal enclosure containing an optical grade oil 30 and having a plurality of windows permitting light to enter and exit the enclosure. For example, a first window 32 allows light from the source 12 to enter the enclosure 28 and reach the polarizer/analyzer 26. In the preferred embodiment, window 32 comprises a positive power lens which permits the reimaging of an aperture (not shown) after the polarization converter 24 onto the liquid crystal light valves in the manner of a relay lens to give a sharp image of that aperture.

With respect to the polarizer/analyzer 26, the immersion in the optical grade oil 30 has the advantage of minimizing astigmatism and maximizing image contrast.

Mounted adjacent to the polarizer/analyzer 26 and outside the enclosure 28 is a single output projection lens 34, having an output projection axis 36 which extends at an angle, such as 45°, to the plane of the polarizer/analyzer 26. Full color light of polarization state S, as indicated in the drawing by the symbols $W_S$ and $W_S'$, is reflected by the polarizer/analyzer rearwardly along the projection axis 36 toward three reflective liquid crystal light valves 38, 40 and 42 that are individually associated with different colors. Each of the light valves is coupled with a respective one of three separate sources of input or writing light, such as cathode ray tubes 44, 46 and 48. The "red" LCLV 40 is positioned on the axis 36 and the "blue" and "green" LCLVs 38 and 42 are positioned onto opposite sides of the axis.

Interposed between the polarizer/analyzer 26 and the three liquid crystal light valves is a pair of dichroic mirrors (dichroic filters) 50 and 52, each of which is configured and arranged, as by provision of particular reflective coatings in a well-known manner, to selectively reflect and transmit light of different colors. The dichroic mirrors 50 and 52 act in substantially the same manner on such light regardless whether it is S or P polarization state. Thus, dichroic mirror 50 is coated so as to reflect blue light having a wavelength on the order of about 420 to 500 nanometers, and to transmit all light, green and red, having longer wavelengths. Thus, dichroic mirror 50 reflects blue light of polarization state S, as indicated by the symbol $B_S$, along light path 55 to the blue liquid crystal light valve 38. The latter is termed "blue" solely because it controls the blue readout light. The liquid crystal light valve control is provided by light from its cathode ray tube 44 in a form that represents the blue component of a multi-colored image that is to be projected.

Dichroic mirror 50 transmits light above about 500 nanometers, which includes red and green light as indicated by the symbol $(R,G)_S$ to the second dichroic mirror 52. Both mirrors 50 and 52 are positioned at a substantial angle, such as 45°, with respect to the projection axis 36, with mirror 50 being oriented so as to reflect light toward one side of the projection axis and mirror 52 being oriented for reflection of light to the opposite side of the projection axis. It will be readily understood that the two dichroic mirrors alternately may be parallel to one another so that both will reflect to the same side of projection axis (in which case both LCLVs 38 and 42 are on such side of the axis). With the relative orientations illustrated in FIG. 1, light reflected from dichroic mirror 52, which in this case is green light having a wavelength in the range of about 500–590 nanometers, is reflected to the green liquid crystal light valve 42 upon reflection from folding mirror 54. This light is indicated by the symbol $G_S$. This liquid crystal light valve 42 has an input from its cathode ray tube 48, which is the green component of the image to be projected.

Light impinging on all LCLVs, regardless of color, is of S polarization state. The dichroic mirror 52 reflects the green light but transmits light of all longer wavelengths, which in this case is the red light as indicated by symbol $R_S$. Thus, the red light is transmitted through both of the dichroic mirrors along the projection axis to impinge upon the red liquid crystal light valve 40, which has its active face positioned perpendicular to the projection axis 36. As illustrated in FIG. 1A, the other liquid crystal light valves have their active faces positioned on opposite sides of the projection axis. Liquid crystal light valve 40 is optically addressed by its cathode ray tube 46 with an optical signal representing the red color component of the image to be projected. Those areas of each of the liquid crystal light valves that are activated by bright areas of an image from its cathode ray tube writing source (e.g., "light" areas of the LCLV), reflect the S polarization light and concomitantly rotate its polarization 90° so that the reflected light is light of P polarization. Thus, reflected light of P polarization is provided from each liquid crystal light valve in a spatial pattern corresponding to the spatial pattern of the excitation provided by the input writing light.

For those areas of the liquid crystal light valve that are not excited by input writing light ("dark" areas), the reading or illumination light (S polarization) is reflected without change of polarization. Reflected S polarization state light is transmitted and reflected back through the dichroic mirrors 50, 52 to the polarization analyzer 26. The latter selectively reflects light of S state polarization back toward the illumination light source, where it is effectively discarded. Also, much of the S state polarized light is absorbed or dissipated before reaching the illumination source. This prevents any appreciable portion of this light from returning from the source 12 back toward the liquid crystal light valves (by reflection off a light source reflector (not shown)) which would otherwise detract from the contrast ratio.

Red light of P polarization is reflected from light areas of LCLV 40 and transmitted through dichroic mirror 52 for combination with green light of P polarization that is reflected from light areas of the green liquid crystal light valve 42, and reflected from the folding mirror 54 and also from the dichroic mirror 52. Accordingly, the dichroic mirror 52 combines the red and green light reflected from the liquid crystal light valves and having a polarization state P. This combined red and green light is transmitted through the first dichroic filter 50, which receives and reflects P state polarization light reflected from light areas of liquid crystal light valve 38 to provide a combined red, green and blue light of polarization state P that is transmitted back to the polarizer/analyzer 26. The latter, as previously mentioned, will transmit light of polarization state P, and thus the combined multi-colored beam, modulated by the three cathode ray tube inputs, is transmitted from the polarizer/analyzer to the projection lens 34 for projection to a screen (not shown).

The enclosure includes three windows 58, 60 and 62 adjacent to the three LCLVs 38, 40 and 42 respectively. These windows permit light to exit and enter the enclosure 28. Also, window 49 permits light to exit the enclosure 28 to reach the projection lens 34.

Fiber optic couplings 78, 80 and 82 are disposed between the CRTs 44, 46 and 48, and the LCLVs 38, 40 and 42 respectively. Alternatively, relay lenses can be positioned between the CRTs and the LCLVs, replacing the 35 fiberoptic couplings 78, 80 and 82. In any case, air is excluded from the interface between the LCLVs and the LCLV windows of the enclosure 28 by introducing a transparent medium such as glycerin in the space between those surfaces. This transparent medium has an index of refraction that approximates the index of refraction of both the glass of the LCLV output substrate and the glass of the enclosure LCLV windows. Alternatively, the LCLV windows 58, 60 and 62 could be eliminated entirely by adhesively attaching LCLVs to sealed openings in the enclosure or by use of a transparent enclosure 28.

It should be noted that astigmatism in a projected image is frequently present whenever an angled dichroic filter configuration in the projection lens object or image path is in air. Astigmatism also results from the difference in the number of transmissions of the three colors through thicknesses of dichroic mirrors. This astigmatism was partially alleviated in the incorporated by reference patent application Ser. No. 08/040,755, by the introduction of a transparent plate in the path of the light between the dichroic mirror 50 and the blue liquid crystal light valve 38. However, with the use of the immersion medium 30, which is selected so that the index of refraction of the medium is substantially the same as the index of refraction of the glass substrate of the dichroic filters 50, 52, the glass substrate effectively "disappears" from the optical path, substantially reducing the astigmatism problem and eliminating the need for the additional transparent plate in the path of the blue light.

It should be noted that the use of an immersion medium with an index of refraction greater than the index of refraction of air also allows a more compact projector design than is possible when the dichroic filters are in air. As is well known in the art, the back focal length of a given lens is specified with respect to what the lens back focal length is in air. When a lens is immersed in a medium with an index of refraction greater than the index of refraction of air, the actual back focal length (as measured with a graduated scale) is longer than it would be in air. This can be taken advantage of to yield space and cost advantages.

Figure 2:
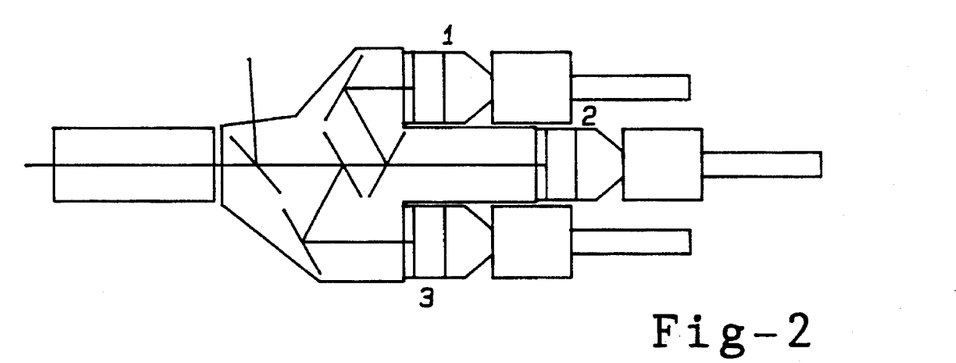
FIG. 2 is a diagram of a second embodiment of the present invention employing a parallel CRT configuration with one CRT on either side of the main optical axis.

The space advantage can be achieved by the use of folding mirrors 54, 56. Folding of the optical path allows the three cathode ray tubes to be positioned so that the axes of the CRTs are roughly parallel. This configuration is shown in FIG. 2. As the CRTs have considerable length and surface area, the ability to orient the CRTs in parallel translates to the ability to significantly reduce the total volume required to implement a projector system. In prior systems, folding could not be accomplished as economically as in the present invention, because in order to fold the path a lens with a longer back focal length (in air) would have to be specified for the system. Generally, the longer the back focal length in air, the larger and more expensive the lens. Consequently, the axes of three CRTs in prior systems are canted at angles with respect to one another, and this configuration requires greater volume to implement than does a parallel arrangement.

The cost advantage of the immersion medium 30 results because the lengthening of the back focal length (due to the immersion medium) of a given lens allows the system designer to specify a less expensive projection lens. Since immersing the lens in a medium with an index of refraction that is higher than air has the effect of increasing its back focal length, a longer actual back focal length can be achieved without specifying a more expensive lens for the projector system. To this end, the angle at which the dichroic filters are positioned can be chosen to create at least two different configurations with respect to the first and third liquid crystal light valves.

Figure 3:
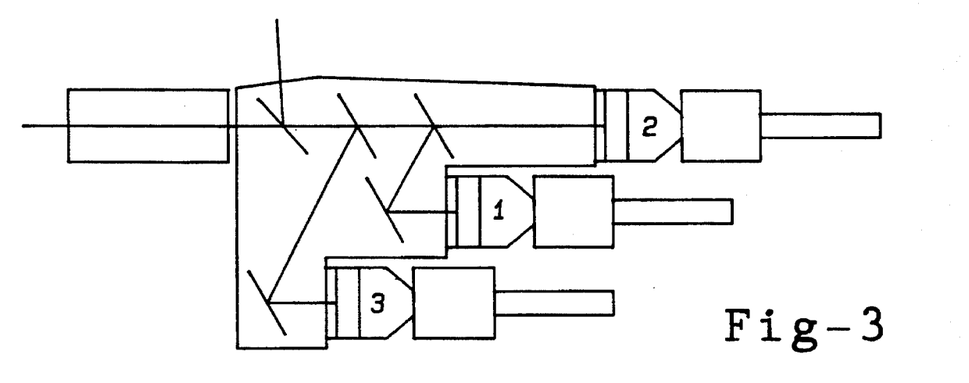
FIG. 3 is a diagram of a parallel CRT embodiment of the present invention having two of the three CRTs on the same side of the optical axis.

Referring now to FIGS. 2 and 3 two alternative embodiments of the present invention are shown. The second LCLV is always located on the axis of the projection lens. In the first of these configurations, shown in FIG. 2, the angle can be selected to allow the first LCLV to be on one side of the projection lens axis and the second LCLV to be on the other side of the projection lens axis. Alternatively, as shown in FIG. 3, the angle can be selected to allow the first and third LCLVs to be located on the same side of the second LCLV and, thus on the same side of the projection lens axis.

Figure 5:
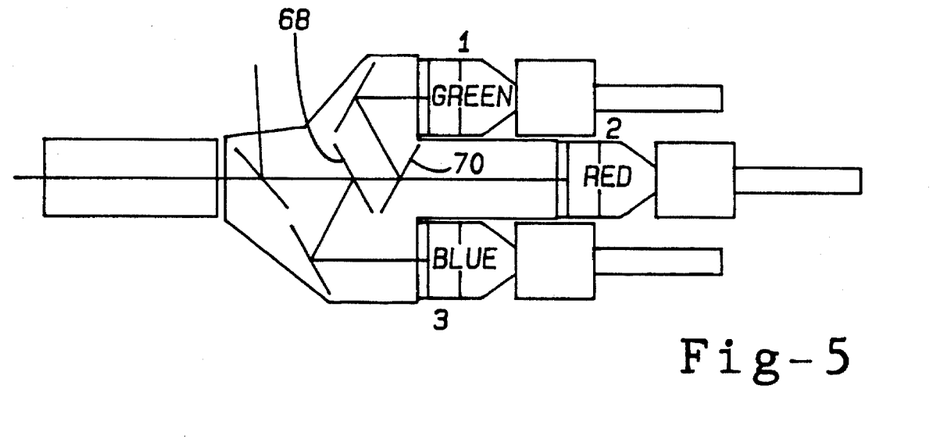
FIG. 5 is an additional embodiment of the present invention similar to the arrangement of FIG. 4 in which the red CRT is disposed on the primary optical axis and the blue and green CRTs are on opposite sides of the primary axis.
Figure 6:
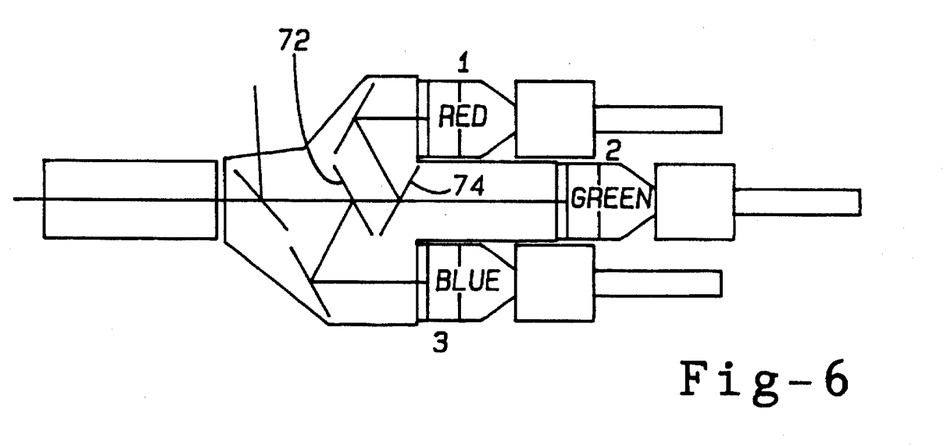
FIG. 6 is an additional embodiment of the present invention similar to the one shown in FIG. 4 having the green CRT on the primary optical axis and the red and blue on opposite sides of the optical axis.

Frequently, video projector systems are designed such that the angle of incidence is fixed for the illumination light; that is, light used to read out the image modulated by each LCLV. When this is the design approach, the particular dichroic filters used can be specified for optimum performance both at that angle of incidence and in the immersion medium of choice. This can be done by optimum selection of coatings, for example. In one embodiment of the present invention, the selection of dichroic filters with optimum characteristics allows the filters to reflect to either side of the axis of the projection lens as shown in FIG. 2. Selecting the dichroic filters in this manner allows the system designer to take maximum advantage of the multiple benefits of this invention. Further, the advantages of this invention can be realized with dichroic filters designed to be high pass filters, as shown in FIG. 4, low pass filters, as shown in FIG. 5 and band pass filters, as shown in FIG. 6 or some combination of one or more of those type filters.

Figure 4:
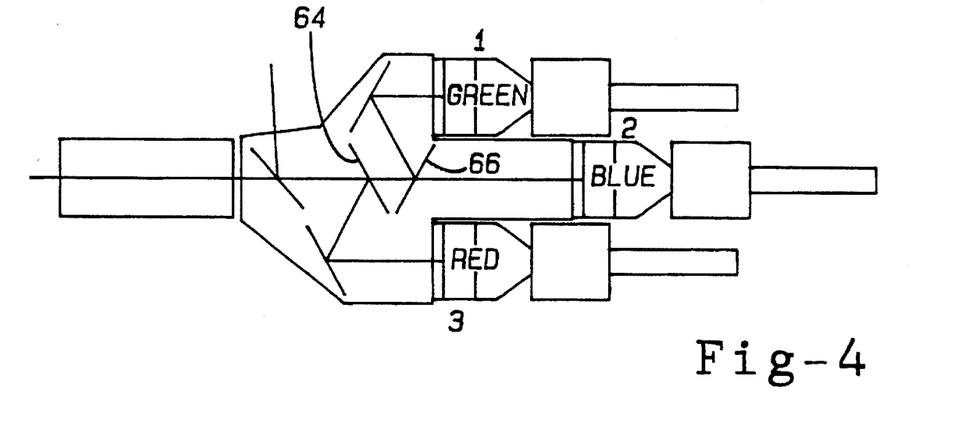
FIG. 4 is a diagram of an additional embodiment of the present invention similar to FIG. 2 in which the blue CRT is on the optical axis and the red and green CRTs are on opposite sides of the optical axis.

In more detail, in FIG. 4, the first dichroic mirror 64 is a high pass filter and reflects only red wavelengths longer than the blue and green wavelengths. The second dichroic mirror 66 is also a high pass filter and it reflects only wavelengths longer than the blue wavelengths. In FIG. 5, the first dichroic mirror 68 is a low pass filter and it reflects only (blue) wavelengths shorter than the green and red wavelengths. The second dichroic 70 is a low pass filter and it reflects only wavelengths shorter than the red wavelengths. In FIG. 6 the first dichroic filter 72 is a low pass filter and it reflects only the blue wavelengths. The second dichroic filter 74 is a high pass or band pass filter which reflects red wavelengths and transmits green wavelengths.

Figure 7:
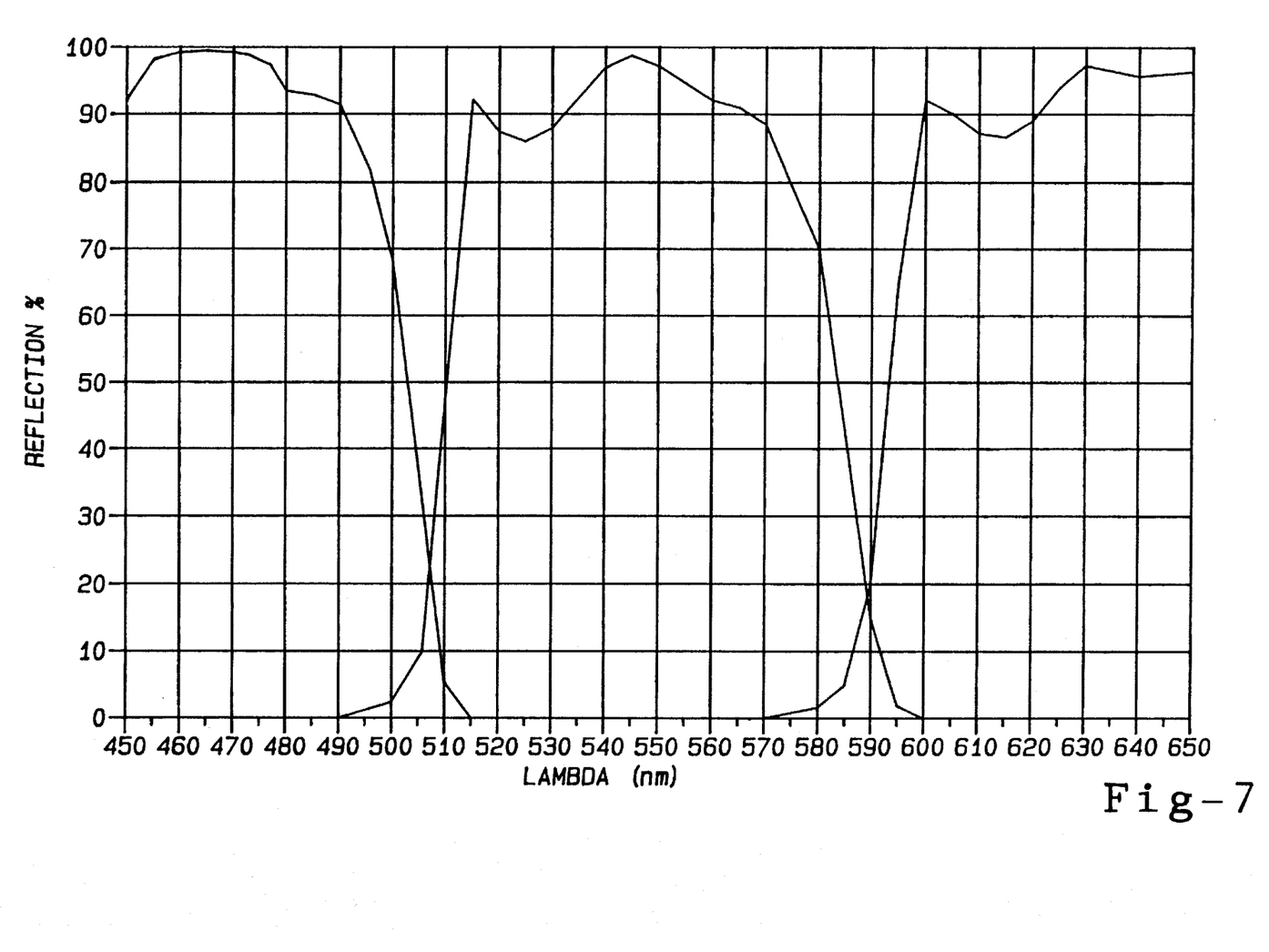
FIG. 7 is a diagram of the reflection percentage versus wavelength for the present invention.

It is notable that the dichroic filter cutoff slope shown in FIG. 7, is steepened for each color as a result of the double pass of light through the dichroic filter system. Further, color cutoffs crossover at some point less than 25% intensity level as shown in FIG. 7. This filtering characteristic also will result even when dichroic filters are selected that have cutoff wavelengths that are substantially the same for both the S and P polarizations of light.

Figure 8:
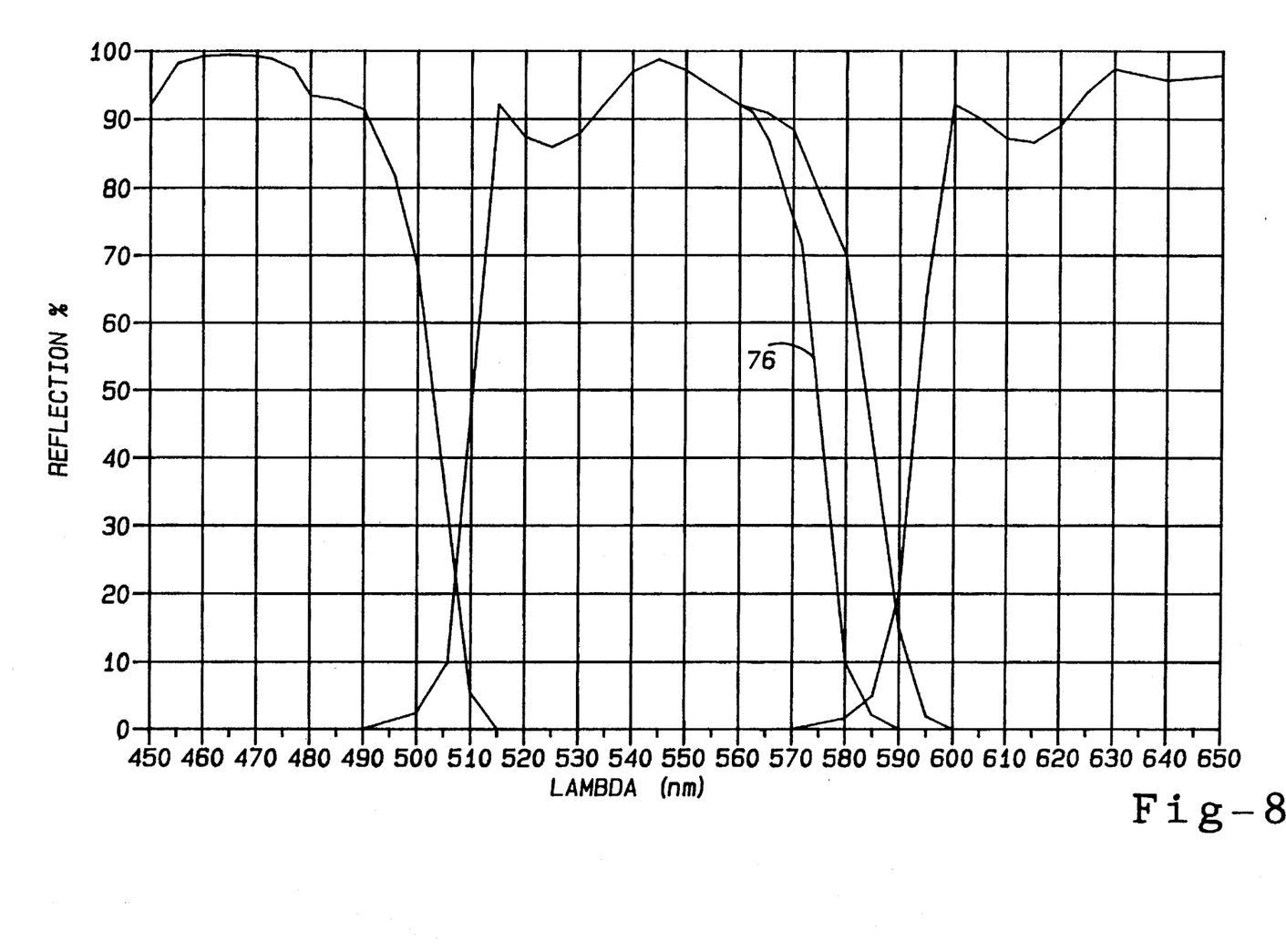
FIG. 8 is a diagram of the reflection percentage versus wavelength illustrating differing green S and P reflection curves to achieve yellow attenuation in accordance with the present invention.

Referring now to FIG. 8, an alternative embodiment has the attribute of widening the notch between colors, for example, to provide greater attenuation between red and green as characterized by the curve 76 in FIG. 8. In this alternative embodiment, which has the same physical layout as the embodiment depicted in FIG. 1, the green dichroic filter 52 is selected such that the S polarization cutoff occurs at a wavelength that is longer than the wavelength at which the P polarization cuts off. The S polarization of green and yellow light is reflected by dichroic filter 52. Dichroic filter 52 then reflects the light to folding mirror 54 and folding mirror 54 reflects it to LCLV 42. When the liquid crystal of LCLV 42 is energized, the light is at least partially rotated from S to P polarization as that polarization is defined with respect to dichroic filter 52. The light that is P polarized corresponds to the positive image information from the CRT or other source used to write to the LCLV. The yellow wavelengths of this P polarized light are beyond the reflective cutoff of the dichroic filter 52. Thus, the yellow light passes through dichroic filter 52 and is eliminated as it strikes the inside wall of the tank and is absorbed. The green wavelengths are reflected. Operation of this embodiment now proceeds from this point as described above. The result is an improvement in color saturation.

An additional advantage of the immersion medium is that it allows more optical surfaces to be excluded from contact with air than was possible in prior single lens projectors. This eliminates dust and other airborne particles from the critical light valve optical imaging path, and thus, reduces particle and haze contamination of the optical surfaces in that path. This is advantageous because particle and haze contamination of the optical surfaces detracts from the contrast ratio and the efficiency of light use.

While the above description constitutes the preferred embodiments of the invention, it will be appreciated that the invention is susceptible to modification, variation, and change without departing from the proper scope or fair meaning of the accompanying claims.

What is claimed is:
1. An optical projection system comprising:
a projection lens;
a source of linearly polarized light having a first orientation;
three reflective liquid crystal light valves (LCLVs)wherein two of said LCLVs are arranged in an approximately parallel relationship and one of the said LCLVs is oriented at an angle less than 45° with respect to said two of said LCLVs;
means for energizing the LCLVs;
polarizer analyzer disposed to receive and reflect polarized light from said source;
first dichroic filter disposed in the path of light reflected from said polarizer analyzer which reflects light of a first wavelength band and transmits light of second and third wavelength bands, the light of the first wavelength band being thereupon transmitted to a first LCLV;
second dichroic filter receiving light of the second and third wavelength bands from the first dichroic filter and reflecting light of a second wavelength band and transmitting light of a third wavelength band, the light of the second wavelength band and third wavelength bands being thereupon transmitted to the second and third LCLVs respectively, wherein the means for energizing the LCLVs causes selected areas of the LCLVs to rotate the polarization of the incoming light from the light source, and wherein upon its reflection off the LCLVs the light returns along its incoming path, the three bands of light being recombined as they pass through the first and second dichroic filters in a reverse direction, the combined light being transmitted by the polarizer analyzer in selected areas due to its rotated polarization toward said projection lens; and
an enclosure substantially filed with a transparent, liquid media enclosing at least the first and second dichroic filters and the polarizer analyzer, the enclosure being in contact with the LCLVs, wherein the light path between the polarizer analyzer, the dichroic filters, the LCLVs and the projection lens traverses the liquid media and does not traverse air.
2. The optical projection system of claim 1, further comprising a projection lens disposed adjacent the enclosure for receiving and focusing the combined light transmitted through the polarizer analyzer, wherein the back focal length of the projection lens is determined in part by the index of refraction of the optical media inside the enclosure.
3. The optical projection system of claim 2, wherein the optical media in the enclosure has an index of refraction that is higher than air.
4. The optical projection system of claim 1, wherein said means for energizing the LCLV's comprises a Cathode Ray Tube (CRT).
5. The optical projection system of claim 1, further comprising a first folding mirror for receiving light from said first dichroic filter and reflecting said light onto said first LCLV, and a second folding mirror for receiving light from said second dichroic mirror of said second wavelength band and reflecting said light onto said second LCLV, and wherein said first and second LCLV's are disposed on opposite sides of the optical path of the light entering the third LCLV.
6. The optical projection system of claim 5, wherein said LCLV's are disposed in a parallel orientation.
7. A liquid crystal light valve color projection system comprising:
a projection lens having a projection axis;

first, second and third reflective liquid crystal light valves of which one is positioned on said projection axis and the others are positioned in an approximately parallel relationship on at least one side of said projection axis;

a polarization analyzer positioned on said projection axis between said projection lens and said liquid crystal light valves, said polarization analyzer including means for transmitting light of a first polarization state and reflecting light of a second polarization state and reflected light of a second polarization state;

dichroic mirror means positioned on said axis between said polarization analyzer and said liquid crystal light valves for separating light from said polarization analyzer into light of separate colors from said polarization analyzer to respective ones of said liquid crystal light valves, said dichroic mirror means including means for combining light reflected from said liquid crystal light valves into combined beam and directing said combined beam back to said polarization analyzer for transmission to said projection lens;

means for directing a beam of polarized reading light to said polarization analyzer;

means for directing writing light to said liquid crystal light valves; and enclosure containing a liquid media enclosing at least the dichroic mirror means and the polarization analyzer, the enclosure being in contact with the liquid crystal light valves, wherein the path of light between the liquid crystal light valves, the dichroic mirror means and the polarization analyzer transverses the media and does not transverse air.

8. The projection system of claim 7 wherein said dichroic mirror means comprises a plurality of dichroic mirrors each configured and arranged to transmit and reflect light from the polarization analyzer and to transmit and reflect light reflected from said liquid crystal light valves.

9. The projection system of claim 7 wherein said dichroic mirror means comprises a plurality of dichroic mirrors each configured and arranged to transmit and reflect light from the polarization analyzer of a first polarization state and transmit and reflect light from said liquid crystal light valves of a second polarization state.

10. The projection system of claim 7 wherein said dichroic mirror means comprises first and second dichroic mirrors positioned on said projection axis and oriented at an angle thereto.

11. A method for projecting a color image comprising the steps of:

providing a single projection lens having a projection axis;

positioning a first reflective liquid crystal light valve on said projection axis;

positioning second and third reflective liquid crystal light valves on at least one side of said projection axis wherein two of said liquid crystal light valves are approximately parallel and one of said liquid crystal light valve is positioned at an angle less than 45° with respect to said two liquid crystal light valves;

directing a light beam having a first polarization state along said projection axis toward said liquid crystal light valves;

separating said light beam into light of different colors and directing said light of different colors to respective ones of said reflective liquid crystal light valves;

providing an input to each of said liquid crystal light valves to cause said liquid crystal light valves to reflect light with a second polarization state having spatial patterns representing said liquid crystal light valve inputs;

combining light reflected from said liquid crystal light valves into a combined multi-colored beam;

enclosing the path of said light beam between said projection lens and said liquid crystal light valves in a liquid optical media having an index of refraction substantially greater than that of air wherein said path between said liquid crystal light valve and said projection lens does not traverse air; and directing said combined beam back to said projection lens for transmission.

12. The method of claim 11 wherein said step of directing a light beam having a first polarization state includes preventing reflection toward said liquid crystal light valves of light having a polarization state different than said first polarization state.

13. The method of claim 11 wherein said step of separating light into light of separate colors comprises reflecting blue light to said first liquid crystal light valve and transmitting red and green light, reflecting green light to said second liquid crystal light valve, and transmitting red light to said third liquid crystal light valve.

14. The method of claim 13 wherein said step of combining light reflected from said liquid crystal light valves comprises combining red light reflected from said third liquid crystal light valve with green light reflected from said second liquid crystal light valve to form a red/green beam, and combining said red/green beam with blue light reflected from said first liquid crystal light valve.

15. The method of claim 14 including the step of narrowing the reflection spectrum for light of said second polarization state reflected from said liquid crystal light valves to thereby decrease undesired light of selected spectral content.

16. The method of claim 14 wherein said step of combining light reflected from said liquid crystal light valves comprises reflecting light from a dichroic filter, and including the step of narrowing the reflection spectrum of said dichroic filter to eliminate reflection of light of a selected spectral content.

17. The system of claim 1 wherein said source of linearly polarized light further comprises:

means for converting unpolarized light into two separate beams of differently polarized light;

means for converting the polarization of one of said beams to be the same as the other; and means for directing both beams along the same optical path prior to their reaching said polarization analyzer.

* * * * *